Figure 1:
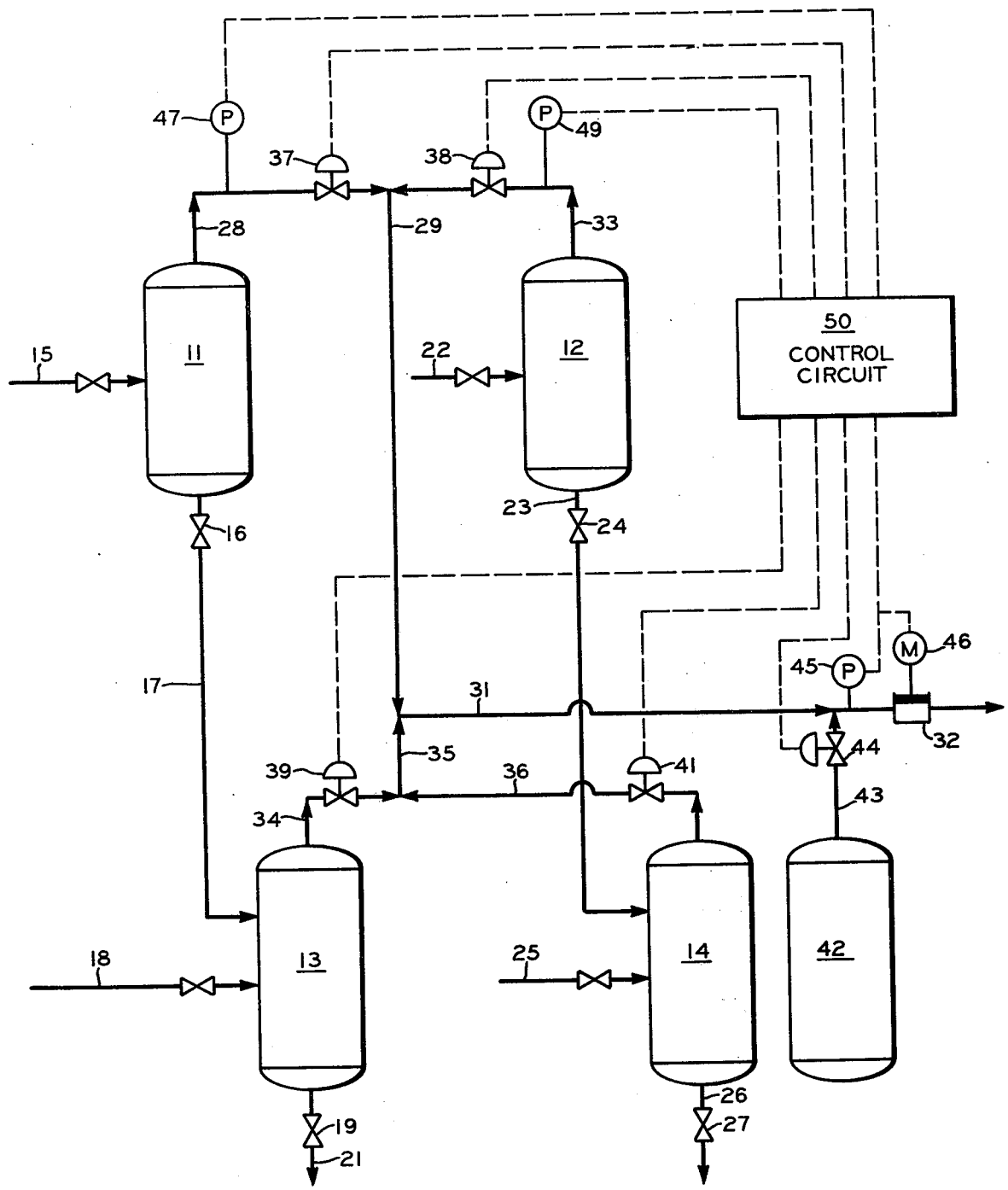

United States Patent [19]

Whitson et al.

[11] 4,019,524

[45] Apr. 26, 1977

[54] USE OF EQUALIZATION CHAMBER IN DISCONTINUOUS VENTING OF VESSEL

[75] Inventors: Bobbie L. Whitson; John A. Morgan, both of Bartlesville, Okla.

[73] Assignee: Phillips Petroleum Company, Bartlesville, Okla.

[22] Filed: June 17, 1976

[21] Appl. No.: 697,005

Related U.S. Application Data

[60] Continuation of Ser. No. 391,662, Aug. 27, 1973, abandoned, which is a division of Ser. No. 225,171, Feb. 10, 1972, Pat. No. 3,780,761.

[52] U.S. Cl. .................................. 137/14; 137/572
[51] Int. Cl.² ................... G05D 7/06; G05D 16/20
[58] Field of Search ............ 137/14, 118, 119, 121, 137/572

[56] References Cited

UNITED STATES PATENTS 3,142,547   7/1964   Marsh et al. ..................... 55/58 X Primary Examiner—Alan Cohan
Assistant Examiner—Gerald A. Michalsky

[57] ABSTRACT

A vessel to be vented on a discontinuous basis is connected by first conduit means, containing a first valve means, to the inlet of a compressor. An equalization chamber is connected by second conduit means, containing a second valve means, to the first conduit means at a point between the first valve means and the inlet of the compressor. The valves are selectively actuated to initially connect the vessel and the equalization chamber to permit the gas pressures therein to equalize then to close off the chamber while the compressor withdraws additional gas from the vessel until the desired pressure is reached, and finally to withdraw gas from the chamber. The equalization chamber and compressor can be employed to sequentially vent a plurality of vessels. A control means can be utilized to perform the selective actuation of the valves.

15 Claims, 2 Drawing Figures

4,019,524

USE OF EQUALIZATION CHAMBER IN DISCONTINUOUS VENTING OF VESSEL

This is a continuation of our copending application Ser. No. 391,662, filed Aug. 27, 1973, now abandoned, which in turn is a division of our then copending application Ser. No. 225,171, filed Feb. 10, 1972, now U.S. Pat. No. 3,780,761.

The invention relates to method and apparatus for discontinuous venting of at least one vessel. In a specific aspect the invention relates to the utilization of an equalization chamber as an aid in venting a vessel.

In many batch processes it is necessary to periodically vent one or more vessels. The venting operation can consume a significant portion of the cycle time, thereby reducing production, as well as require the attention of the operator, thereby increasing the operating cost. Although larger compressors can be employed to conduct the venting operation in a shorter period of time, the larger compressors carry higher capital costs and would be utilized for a smaller precent of the time, thereby decreasing efficiency.

In accordance with the present invention it has been discovered that the use of an equalization vessel permits the time for venting a vessel to be reduced for a given size compressor and/or the size of the compressor to be reduced. The utilization of an automatic control system for operating the vent valves and the compressor substantially reduces the time of the operator needed for the venting operation.

Accordingly, it is an object of the invention to provide new and improved method and apparatus for venting a vessel on a discontinuous basis. Another object of the invention is to reduce the down time of a process necessary to permit the venting of a vessel. Yet another object of the invention is to provide an improved automatic control system for a venting operation. A further object of the invention is to reduce the time of a process operator needed to conduct the venting of a vessel. Other objects, aspects and advantages of the invention will be apparent from a study of the specification, the drawings and the appended claims to the invention.

Figure 2:
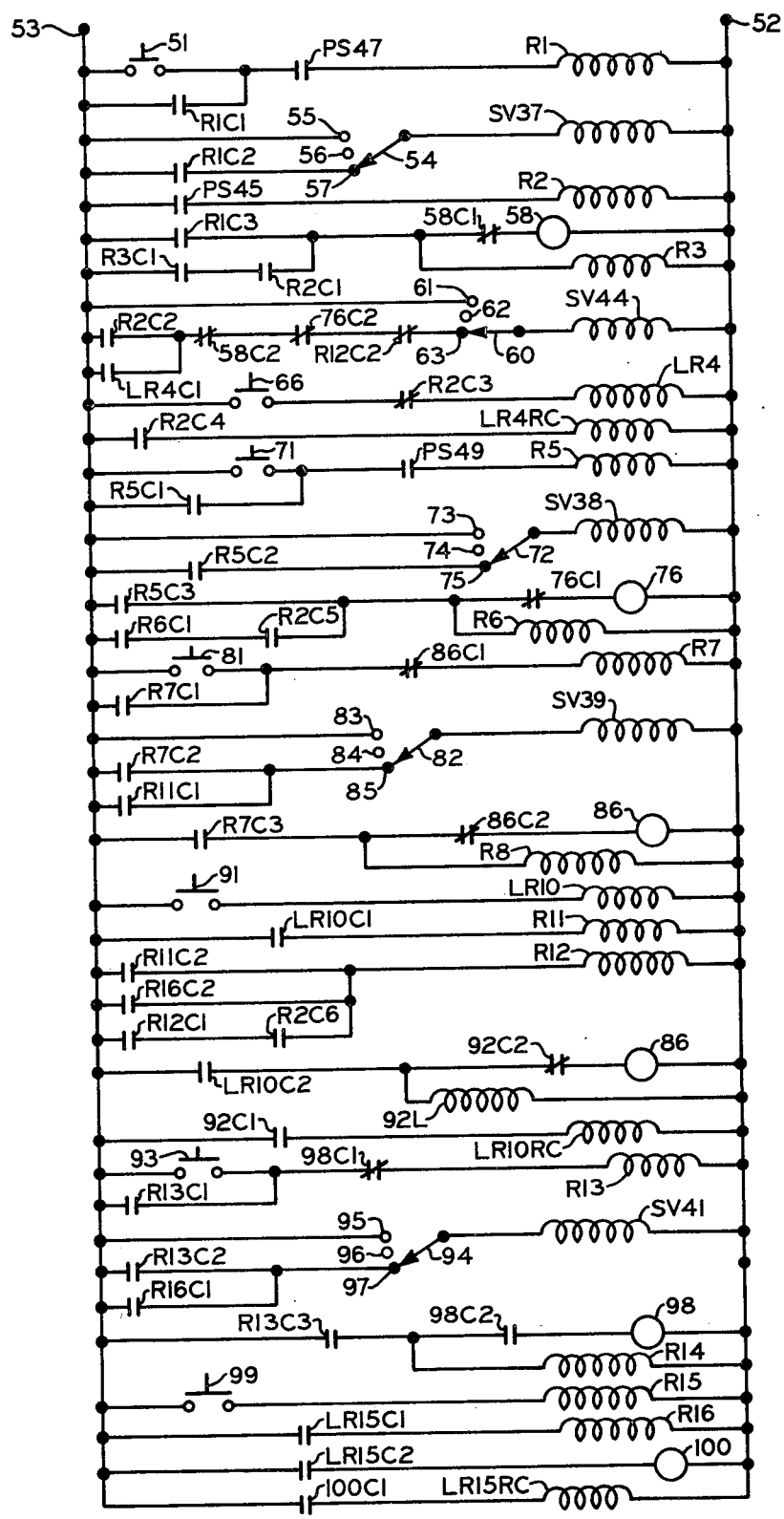

In the drawings, FIG. 1 is a diagrammatic representation of a process embodying the present invention, and FIG. 2 is a schematic representation of an electrical circuit which can be utilized as the control circuit of FIG. 1.

Referring now to the drawings and FIG. 1 in particular, there is illustrated a batch reaction system comprising batch reactors 11 and 12 and their associated receiving vessels 13 and 14, respectively. The reactants for the batch reaction are introduced into reactor 11 through one or more input lines 15. When the reaction has reached the desired state, valve 16 in conduit 17 is opened to pass the liquid reaction product from a lower portion of reactor 11 into receiver vessel 13. Additional reactants such as shortstop agents or chain terminating agents can be introduced into receiver vessel 13 through one or more input conduits 18. After the desired residence time in vessel 13, valve 19 can be opened to withdraw the liquid reaction product from vessel 13 by way of conduit 21. Similarly, the reactants can be introduced into batch reactor 12 through one or more input conduits 22 and at the end of the desired reaction time, the liquid reaction effluent can be passed through conduit 23 and valve 24 into receiver vessel 14. The additional reactants can be introduced into vessel 14 through one or more conduits 25 and after the desired contact time in vessel 14, the liquid reaction product can be withdrawn therefrom by way of conduit 26 and valve 27.

Conduits 28, 29 and 31 are connected in series to provide fluid communication between an overhead portion of reactor 11 and the inlet of compressor 32 for the removal of excess gaseous material from reactor 11. Similarly, conduits 33, 29 and 31 provide fluid communication from an overhead portion of reactor 12 to the inlet of compressor 32. The overhead portion of vessel 13 is connected to the inlet of compressor 32 by means of serially connected conduits 34, 35 and 31 while vessel 14 is connected to the inlet of compressor 32 by the serial connection of conduits 36, 35 and 31. Conduits 28, 33, 34 and 36 contain on-off valves 37, 38, 39 and 41, respectively, to permit the selective venting of the individual reactors 11 and 12 and vessels 13 and 14.

In accordance with the present invention a vent equalization vessel 42 is connected to conduit 31 by means of conduit 43 and valve 44. Although some of the benefits of the present invention can be achieved with vessel 42 being smaller than any of vessels 11, 12, 13 and 14, it is presently preferable that vessel 42 be at least as large as and more preferably significantly larger than vessels 11, 12, 13 and 14.

When it is desired to vent reactor 11, valve 37 and valve 44 are opened to provide communication between reactor 11 and vent equalization vessel 42 and the inlet of compressor 32. A pressure sensor 45 can be mounted on conduit 31 to determine the pressure of the gas contained therein and to establish a control signal responsive to the thus determined pressure. This control signal can be utilized to actuate motor 46 of compressor 32 when the pressure in conduit 31 reaches a predetermined level. Conduits 28, 29 and 31 and 43 are of sufficient size to permit the gas pressure in vessels 11 and 42 to reach equilibrium quickly. After the gas pressures in vessels 11 and 42 have reached at least substantially equal values, valve 44 can be closed so that compressor 32 draws suction only on reactor vessel 11. A pressure sensor 47 can be mounted on conduit 28, upstream of valve 37, to determine the pressure of the gas flowing therethrough and establish a control signal representative thereof. This control signal can be utilized to close valve 37 after the gas pressure in vessel 11 has been reduced to the desired minimum value. Valve 44 can then be open in response to the closing of valve 37 or in response to a timer which indicates the passage of a period of time sufficient for the gas pressure in reactor 11 to have been reduced to the desired value. Thereafter compressor 32 draws suction on vent equalization vessel 42. The venting of reactor vessel 12 can be accomplished in the same manner as for reactor vessel 11 with pressure sensor 49 being mounted in communication with vessel 12 in correspondence to the function of pressure sensor 47.

When it is desired to vent receiver vessel 13, valve 39 can be opened and compressor motor 46 will again be actuated by pressure sensor 45. Valve 44 can be opened to permit the gas pressures in vessels 13 and 42 to at least substantially reach equilibrium. If desired valve 44 can then be closed and suction drawn on vessel 13 by compressor 32 until the desired minimum pressure in vessel 13 is achieved. However in some systems this may not be necessary, and valve 39 can be closed after equilibrium vessels 13 and 42 is achieved so that compressor 32 is utilized to evacuate vessel 42.

If desired, a further reduction in the gas pressure in vessel 13 can be effected by compressor 32 subsequent to the pressure in vessel 42 being reduced to the desired value, e.g., during the time that vessel 13 is being filled with the liquid reaction effluent from reactor 11. The venting of receiver vessel 14 can be accomplished in the same manner as for vessel 13.

When fully automatic control or operator initiated automatic control of the venting processes is desired, the output signals from pressure sensors 45, 47 and 49 can be transmitted to the inputs of a control circuit 50, with valves 37, 38, 39, 41, and 44 being connected to outputs of control circuit 50.

Referring now to FIG. 2, there is illustrated a specific embodiment of an operator initiated electrical control circuit which can be utilized to carry out the control functions of the control circuit 50 of FIG. 1. When the operator desires to vent reactor 11, he momentarily pushes switch 51 closed. Switch 51 is connected in series with pressure switch PS47 and relay coil R1 between the terminals 52 and 53 of a suitable source of electrical power, for example 117 volts A.C. Pressure switch PS47 is actuated to a closed position when the pressure in conduit 28, as measured by pressure sensor 47, exceeds the desired minimum value, and is in the open position when the pressure in conduit 28 is less than or equal to this desired minimum value. The simultaneous occurrence of the closed conditions of switches 51 and PS47 actuates relay R1, thereby effecting the closure of latch switch R1C1 which is connected in parallel with switch 51 to maintain the activated state for relay R1 after the operator releases the push button of switch 51.

The solenoid coil SV37 is connected between power supply terminal 52 and the contactor of a switch 54. Switch 54 can be manually actuated to a first position (manual open) in contact with terminal 55, which is connected to the opposite power supply terminal 53 to thereby energize solenoid coil SV37 to actuate valve 37 to an open condition. Switch 54 can be manually moved to a second position (manual closed) in contact with blank terminal 56, resulting in the de-energization of solenoid coil SV37 and the closing of valve 37. Switch 54 can be manually positioned in a third position (automatic) in contact with terminal 57, which is connected through switch R1C2 to the power supply terminal 53. Terminals 55 and 56 represent the manual mode of operation while terminal 57 represents the automatic mode of operation for valve 37. Switch R1C2 is actuated to a closed position upon the energization of relay coil R1, and when the contactor of switch 54 is on terminal 57, this results in the energization of solenoid coil SV37 and the opening of valve 37.

The actuation of relay R1 also effects the closing of switch R1C3 which is in series with timer 58 and its cam actuated normally closed switch 58C1 between the power supply terminals 52 and 53, thereby starting timer 58. Timer clutch coil R3 is also connected in series with switch R1C3 between terminals 52 and 53 and is energized upon the closing of switch R1C3. Pressure switch PS45 and relay coil R2 are connected in series between the power supply terminals, and normally open switch PS45 is actuated to a closed condition when the signal from pressure sensor 45 indicates that the pressure in conduit 31 exceeds the desired minimum operating value for the inlet of compressor 32. The signal from pressure sensor 45 also turns on compressor motor 46 when the pressure in conduit 31 exceeds this desired minimum operating value. Normally open switches R3C1 and R2C1 are connected in series across the terminals of switch R1C3. Switch R2C1 is closed upon the actuation of relay R2 while switch R3C1 is closed upon the actuation of timer clutch coil R3. Simultaneous occurrence of the closed condition of switches R3C1 and R2C1 will maintain timer clutch coil R3 actuated even though relay R1 is subsequently deactuated, thereby opening the switch R1C3.

Solenoid coil SV44 is connected between terminal 52 of the power supply and the contactor of switch 60. Switch terminal 61 is connected to the terminal 53 of the power supply and represents the manual mode of opening valve 44. Blank terminal 62 represents the manual mode position for de-energizing solenoid coil SV44 and thereby closing 44. Terminal 63 is connected to the terminal 53 of the power supply through a serial arrangement of normally closed switches R12C2, 76C2, and 58C2 and normally open switch R2C2. When the contactor of switch 60 is on terminal 63 (automatic mode), the acttivation of relay R2 effects the closing of normally open switch R2C2, thereby activating solenoid coil SV44 to open valve 44 to the vent surge vessel 42.

At the expiration of a preset time period determined by the setting of timer, 58, the timer operated cam opens switch 58C2 to deactivate solenoid coil SV44, thereby closing valve 44. The period of time determined by timer 58 is sufficient for the gas pressure in vessels 11 and 42 to become equalized. The timer 58 then maintains switch 58C2 in the opened until timer clutch coil R3 is de-energized. Compressor 32 continues the evacuation of reactor vessel 11 until the pressure therein reaches the predetermined desired value, at which time the signal from pressure sensor 47 opens switch PS47, thereby deactuating relay R1 and opening switches R1C1, R1C2 and R1C3. The opening of switch R1C2 deactuates solenoid coil SV37, thereby causing valve 37 to close. Compressor 32 continues a reduction in the presssure of the gas in conduit 31 until the pressure measured by pressure sensor 45 reaches the preset value at which pressure switch PS45 is opened and compressor motor 46 is deactuated, thereby de-energizing relay R2 to open switches R2C1 and R2C2. The opening of switch R2C1 deactivates timer clutch coil R3 which resets timer 58, as switch R1C3 is already open.

This leaves vent equalization vessel 42 containing the equilibrium quantity of gaseous material from reactor 11. When the operator is ready to vent vessel 42, he momentarily actuates push button control switch 66, which is connected in series with normally closed switch R2C3 and latching relay coil LR4 between the terminals of the power supply. Switch R2C3 is in the closed position when relay R2 is de-energized as a result of pressure switch PS45 being open because the pressure in conduit 31 is less than the minimum desired operating value for compressor 32. Similarly, switch R2C3 is in the open condition whenever switch PS45 is closed. The actuation of latching relay coil LR4 closes switch LR4C1, which is in parallel with switch R2C2, thereby energizing solenoid coil SV44, resulting in valve 44 being opened. The gaseous material in vessel 42 enters conduit 31 and the resulting increase in pressure is detected by pressue sensor 45 and compressor motor 46 is energized. Pressure sensor 45 also closes pressure switch PS45, thereby energizing relay R2. The actuation of relay R2 results in the closing of switch R2C2 to provide an alternate path for the actuation of solenoid SV44. The actuation of relay R2 also opens switch R2C3 to prevent accidental actuation of latch relay LR4, and closes switch R2C4, thereby actuating latch relay release coil LR4RC to return latch relay R4 to its normal unactivated condition. Compressor 32 continues the evacuation of vent equalization vessel 42 until the gas pressure measured by pressure sensor 45 drops sufficiently low for the pressure signal to cause switch PS45 to open, thereby deactuating relay R2. The deactuation of relay R2 effects the opening of switch R2C2, resulting in the de-energization of solenoid coil SV44 and the accompanying closing of valve 44. At this time the venting operation for reactor 11 has been completed and the venting system is available for venting of the next vessel.

When the operator desires to vent reactor vessel 12, momentarily pushes manual push button 71, which is connected in series with pressure switch PS49 and relay R5. Pressure switch Ps49 is maintained in a closed condition by the signal from pressure sensor 49 so long as the measured gas pressure in conduit 33 upstream of valve 38 exceeds the predetermined desired minimum value, and is in the open position when the pressure in conduit 33 is less than or equal to this desired minimum value. Upon the simultaneous occurrence of the closed condition of switches 71 and PS49, relay R5 is actuated, resulting in the closing of switch R5C1 which is in parallel with switch 71, thereby maintaining the energization of relay R5 after switch 71 is released.

The solenoid coil SV38 is connected between power supply terminal 52 and the contactor of a switch 72. The manual open mode switch terminal 73 is connected to power supply terminal 53, while the manual closed mode switch terminal 74 is a blank terminal. The automatic mode terminal 75 is connected to power supply terminal 53 through switch R5C2. Switch R5C2 is actuated to a closed position upon the energization of relay coil R5, and when the contactor of switch 72 is in the automatic mode position, this results in the energization of solenoid coil SV38 and the opening of valve 38.

The activation of relay R5 also effects the closing of switch R5C3 which is in series with timer 76 and it cam operated normally closed switch 76C1 between the power supply terminals 52 and 53, thereby starting timer 76. Timer clutch coil R6 is also connected in series with switch R5C3 between terminals 52 and 53, and is energized upon the closing of switch R5C3. Normally open switches R6C1 and R2C5 are connnected in series across the terminals of switch R5C3. Switch R2C5 is closed upon the actuation of relay R2, while switch R6C1 is closed upon the actuation of timer clutch coil R6. Simultaneous occurrence of the closed condition of switches R2C5 and R6C1 will maintain timer clutch coil R6 actuated even though relay R5 is subsequently deactuated thereby opening switch R5C3. The actuation of relay R2 closes switch R2C2 to energize solenoid coil SV44 and thereby open valve 44.

At the expiration of a preset time period determined by the setting of timer 76, switch 76C2 is opened by the timer operated cam deactivate solenoid coil SV44, thereby closing valve 44. This period of time determined by timer 76 is sufficient for the gas pressure in vessels 12 and 42 to become equalized. Compressor 32 continues the evacuation of reactor 12 until the pressure therein reaches the predetermined desired value, at which time the signal from pressure sensor 49 opens switch PS49, thereby deactuating relay R5 and opening switches R5C1, R5C2 and R5C3. The opening of switch R5C2 deactuates solenoid coil SV38, thereby causing valve 38 to close. Compressor 32 continues a reduction in the pressure of the gas in conduit 31 until the pressure measured by pressure sensor 45 reaches the predetermined value at which time the compressor motor 46 is deactuated and pressure swich PS45 is opened, thereby de-energizing relay R2 to open switches R2C2 and R2C5. The opening of switch R2C5 deactivates timer clutch coil R6 as switch R5C3 is already open. This leaves the vent equalization vessel 42 containing the equilibrium quantity of gaseous material from reactor 12, and this can be vented by the operator closing switch 66 as previously described in connection with the venting of reactor 11.

When the operator desires to vent receiver vessel 13, he momentarily closes push button switch 81. Switch 81, relay R7, and normally closed switch 86C1 are connected in series between power supply terminals 52 and 53. The simultaneous occurrence of the closed conditions for switches 81 and 86C1 results in the energization of relay R7, which effects the closing of latch switch R7C1, the latter being connected in parallel with switch 81 to maintain the energization of relay R7.

Solenoid coil SV39 is connected between power supply terminal 52 and the contactor of switch 82. The manual open mode terminal 83 of switch 82 is connected to power supply terminal 53, while the manual closed mode terminal 84 is a blank terminal. The automatic mode terminal 85 is connected to power supply terminal 53 through switch R7C2. The energization of relay R7 effects the closing of switch R7C2 to activate solenoid coil SV39 when switch 82 is in the automatic mode position. When solenoid coil SV39 is in the activated state, it effects the opening of valve 39 to provide fluid communication between receiver vessel 13 and the inlet of compressor 32. The increase in pressure resulting from the flow of gas from vessel 13 into conduit 31 is measured by pressure sensor 45, and the signal from pressure sensor 45 activates compressor motor 46 and PS45 which activates relay R2. Relay R2 closes switch R2C2 to energize solenoid coil SV44, thereby opening valve 44.

The actuation of relay R7 also closes switch R7C3, which is connected in series with timer 86 and cam operated, normally closed switch 86C2 between power supply terminals 52 and 53. Timer clutch coil R8 is also connected in series with switch R7C3 between terminals 52 and 53. Thus, the closing of switch R7C3 results in the activation of timer 86 and timer clutch coil R8. Even with compressor 32 in operation, the gas pressures in receiving vessel 13 and vent surge vessel 42 reach equilibrium in a short period of time. Timer 86 is set so that shortly after this period of time necessary for the gas pressures in vessels 13 and 42 to reach equilibrium, the timer operated cam opens switch 86C1 to deactivate relay R7, which in turn causes switches R7C1 and R7C2 to open, the latter effecting the deactivation of solenoid coil SV39 and thus the closing of valve 39. The deactivation of relay R7 also results in the opening of switch R7C3 to deactuate timer clutch coil R8 and to thereby reset timer 86. Compressor 32 continues operation until the pressure in conduit 31 reaches the minimum desired operating value, at which time the compressor motor 46 is shut off and switch PS45 is opened, thereby deactuating relay R2 and opening switch R2C2, thus closing valve 44.

When the operator determines that it is time to transfer the liquid contents of reactor 11 through conduit 17 into receiver vessel 13, he opens valve 16 and momentarily closes push button switch 91. Latching relay LR10 and switch 91 are connected in series between power supply terminals 52 and 53.

The energization of latching relay LR10 closes switch LR10C1, which is connected in series with relay R11 between terminals 52 and 53. The actuation of relay R11 switch R11C1, the latter being connected in parallel with switch R7C2, thereby activating solenoid coil SV39 to open valve 39. The actuation of relay R11 also closes switch R11C2, which is connected in series with relay R12 between power supply terminals 52 and 53. Swtiches R12C1 and R2C6 are connected in series across the terminals of switch R11C3 to provide an alternate path to maintain the activation of relay R12. Switch R12C1 is closed by relay R12 during the activated period thereof, while switch R2C6 is closed by relay R2 during the period of activation of relay R2. Relay R12 also opens normally closed switch R12C2, thereby preventing the actuation of solenoid coil SV44 when relay R2 closes switch R2C2 in response to the pressure in conduit 31 reaching a value sufficient to close switch PS45. The gaseous material from receiver vessel 13 enters conduit 31 and pressure sensor 45 transmits a signal to turn on compressor motor 46 and to close switch PS45.

The activation of relay LR10 also closes switch LR10C2 to energize timer 92, which is connected in series with switch LR10C2 between terminals 52 and 53. At the end of a period of time determined by the setting of timer 92, a timer can actuates switch 92C1 to energize latch release coil LR10RC to return relay LR10 to its normal unactivated state. This results in switches LR10C1 and LR10C2 being opened, the former causing relay R11 to be de-energized, thereby opening switches R11C1, R11C2 and R11C3. The opening of R11C1 results in the deactivation of solenoid coil SV39 and the closing of valve 39 as switch R7C2 is not closed in this sequence of operations. Relay R12 remains energized as long as switch R2C6 is closed. However, compressor 32 quickly reduces the pressure in conduit 31 to the value necessary to effect the opening of switch PS45 and the deactivation of relay R2, thereby opening switch R2C6 and de-energizing relay R12.

When the operator determines that it is time to vent receiver vessel 14, he momentarily closes push button switch 93. Switch 93, relay R13 and normally closed switch 98C1 are connected in series between power supply terminals 52 and 53. The simultaneous occurrence of the closed conditions for switches 93 and 98C1 results in the energization of relay R13, which effects the closing of latch switch R13C1, the latter being connected in parallel with switch 93 to maintain the energization of relay R13.

Solenoid coil SV41 is connected between power supply terminal 52 and the contactor of switch 94. The manual open mode terminal 95 is connected to power supply terminal 53, while the manual closed mode terminal 96 is a blank terminal. The automatic mode terminal 97 is connected normally open switch R13C2 to power supply terminal 53. The energization of relay R13 effects the closing of switch R13C2 to activate solenoid coil SV41 when switch 94 is in the automatic mode position. When solenoid coil SV41 is in the activated state, it opens valve 41 to provide fluid communication between receiver vessel 14 and the inlet of compressor 32. The resulting increase in pressure in conduit 31 is detected by pressure sensor 45 and compressor motor 46 and relay R2 are activated. Relay closes switch R2C2 to activate solenoid coil SV44, thereby opening valve 44.

The actuation of relay R13 also closes switch R13C3, which is connected in series with timer 98 and its associated cam operated, normally closed switch 98C2. Timer clutch coil R14 is also connected in series with switch R13C3 between power terminals 52 and 53. Thus, the closing of switch R13C3 results in the energization of timer 98 and timer clutch coil R14. Timer 98 is set so that a short time after the gas pressures in vessels 14 and 42 reach equilibrium, the timer operated cam opens switch 98C1 to deactivate relay R13, thereby opening switches R13C1 and R13C2, deactivating solenoid coil SV41 and closing valve 41. Shortly thereafter pressure sensor 45 shuts off compressor motor 46 and opens switch PS45 to deactivate relay R2 and close valve 44.

When the operator determines that it is time to transfer the liquid contents of reactor 12 through conduit 23 into receiver vessel 14, he opens valve 24 and momentarily closes push button switch 99. Latching relay LR15 and switch 99 are connected in series between power supply terminals 52 and 53. The activation of latching relay LR15 effects the closing of normally open switch LR15C1, which is connected in series with relay R16 between terminals 52 and 53. The actuation of relay R16 closes switch R16C1 which is connected in parallel with switch R13C2, thereby activating solenoid coil 41 to open valve 41. The actuation of relay R16 also closes switch R16C2, which is connected in parallel with switch R11C2 to energize relay R12. Switches R12C1 and R1C6 again provide an alternate path to maintain the activation of relay R12 after relay R16 is de-energized. Switch R12C1 is closed by relay R12 during the period of activation of relay R2. Relay R12 again opens normally closed switch R12C2 to prevent the actuation of solenoid coil SV44, thereby maintaining valve 44 closed, even though the pressure in conduit 31 reaches a value sufficient to activate relay R2 and motor 46.

The activation of relay LR15 also closes switch LR15C2 to energize timer 100. At the end of a period of time determined by the setting of timer 100, a timer cam closes switch 100C1 to energize latch relay release coil LR15RC to return relay LR15 to its normal unactivated state. This period of time is sufficient for compressor 32 to reduce the gas pressure in receiver vessel 14 to the desired value. The restoration of relay LR15 to its normal position opens switches LR15C1 and LR15C2, thereby deactivating relay R16 and timer 100. The deactivation of relay R16 opens switch R16C1 to close valve 41 and opens switch R16C2 to permit the de-energization of relay R12 as soon as switch R2C6 is opened by the deactivation of relay R2.

Reasonable variations and modifications are possible within the scope of the foregoing disclosure, the drawings and the appended claims to the invention.

That which is claimed is:

1. A method of venting on a discontinuous basis gas from a first vessel wherein each venting operation for said first vessel comprises: initially venting said first vessel by withdrawing gaseous material from said first vessel by providing fluid communication between said first vessel and a second vessel, having a significantly lower initial gas pressure than said first vessel, for a period of time sufficient for the gas pressures in said first and second vessels to at least substantially reach equilibrium condition, thereby transferring an equilibrium quantity of gaseous material from said first vessel to said second vessel; discontinuing said fluid communication at the end of said period of time to isolate said second vessel from said first vessel while continuing to vent said first vessel by withdrawing gaseous material from said first vessel by providing fluid communication between said first vessel and the inlet of a gas compressing means until a desired value of gas pressure lower than said equilibrium condition is reached in said first vessel; discontinuing the withdrawal of gaseous material from said first vessel by isolating said first vessel from the inlet of said gas compressing means upon the gas pressure in said vessel reaching said desired value; thereafter withdrawing from said second vessel the equilibrium quantity of gaseous material, transferred thereto from said first vessel, until the gas pressure in said second vessel reaches said lower initial gas pressure by providing fluid communication between said second vessel and the inlet of said gas compressing means, while said first vessel is isolated from the inlet of said gas compressing means, until the gas pressure in said second vessel reaches said lower initial gas pressure, thereby completing this venting operation of said first vessel and making said second vessel and said gas compressing means available for the next venting operation.

2. A method in accordance with claim 1 wherein said second vessel is at least substantially as large as said first vessel, whereby the stated use of said second vessel permits the time for each venting of said first vessel to be reduced for a given size of said gas compressing means.

3. A method in accordance with claim 2 for alternately conducting venting operations for said first vessel and another vessel wherein each venting operation for said another vessel comprises: initially venting said another vessel, at a time when a venting operation for said first vessel is not being conducted, by withdrawing gaseous material from said another vessel by providing fluid communication between said second vessel and said another vessel for a second period of time sufficient for the gas pressures in said second vessel and said another vessel to at least substantially reach equilibrium condition, thereby transferring an equilibrium quantity of gaseous material from said another vessel to said second vessel; then discontinuing the fluid communication between said second vessel and said another vessel at the end of said second period of time to isolate said second vessel from said another vessel; and then withdrawing from said second vessel the equilibrium quantity of gaseous material, transferred thereto from said another vessel, until the gas pressure in said second vessel reaches said lower initial gas pressure by providing fluid communication between said second vessel and the inlet of said compressing means until the gas pressure in said second vessel reaches said lower initial gas pressure, thereby completing the venting operation of said another vessel and making said second vessel and said gas compressing means available for the next venting operation.

4. A method in accordance with claim 3 wherein each venting operation for said first vessel consists essentially of the recited steps therefor; and wherein each venting operation for said another vessel consists essentially of the recited steps therefor.

5. A method in accordance with claim 2 for alternately conducting venting operations for said first vessel and another wherein each venting operation for said another vessel comprises: initially venting said another vessel, at a time when a venting operation for said first vessel is not being conducted, by withdrawing gaseous material from said another vessel by providing fluid communication between said second vessel and said another vessel for a second period of time sufficient for the gas pressures in said second vessel and said another vessel to, at least substantially reach equilibrium condition, thereby transferring an equilibrium quantity of gaseous material from said another vessel to said second vessel; the discontinuing the fluid comminication between said second vessel and said another vessel at the end of said second period of time to isolate said second vessel from said another vessel while continuing to vent said another vessel by withdrawing gaseous material from said another vessel by providing fluid communication between said another vessel and the inlet of said gas compressing means until a desired value of gas pressure lower than the equilibrium condition for said another vessel and said second vessel is reached in said another vessel; discontinuing the withdrawal of gaseous material from said another vessel by isolating said another vessel from the inlet of said gas compressing means upon the gas pressure in said another vessel reaching the desired value for said another vessel; and then withdrawing from said second vessel the equilibrium quantity of gaseous material, transferred thereto from said another vessel, until the gas pressure in said second vessel reaches said lower initial gas pressure by providing fluid communication between said second vessel and the inlet of said compressing means, while said another vessel is isolated from the inlet of said gas compressing means, until the gas pressure in said second vessel reaches said lower initial gas pressure, thereby completing the venting operation of said another vessel and making said second vessel and said gas compressing means available for the next venting operation.

6. A method in accordance with claim 5 wherein each venting operation for said first vessel consists essentially of the recited steps therefor; and wherein each venting operation for said another vessel consists essentially of the recited steps therefor.

7. A method in accordance with claim 1 wherein each venting operation for said first vessel consists essentially of the recited steps therefor.

8. A method in accordance with claim 1 wherein said fluid communication between said first vessel and the inlet of said gas compressing means is also provided during said period of time.

9. a method in accordance with claim 8 wherein said gas compressing means is actuated whenever the gas pressure in said inlet of said gas compressing means is above said lower initial gas pressure.

10. A method in accordance with claim 1 wherein said period of time is a preset time period.

11. A method in accordance with claim 1 wherein the step of withdrawing from said second vessel the equilibrium quantity of gaseous material is initiated in response to the passage of a preset period of time.

12. A method in accordance with claim 1 wherein the step of withdrawing from said second vessel the equilibrium quantity of gaseous material is initiated in response to the gas pressure in said first vessel having been reduced to said desired value.

13. A method of venting on a discontinuous basis gas from a first vessel wherein each venting operation for said first vessel comprises: venting said first vessel by withdrawing gaseous material from said first vessel by providing fluid communication between said first vessel and a second vessel, having a significantly lower initial gas pressure than said first vessel, for a period of time sufficient for the gas pressures in said first and second vessels to at least substantially reach equilibrium condition, thereby transferring an equilibrium quantity of gaseous material from said first vessel to said second vessel; discontinuing said fluid communication at the end of said period of time to isolate said first vessel from said second vessel; and thereafter withdrawing from said second vessel the equilibrium quantity of gaseous material, transferred thereto from said first vessel, until the gas pressure in said second vessel reaches said lower initial gas pressure by providing fluid communication between said second vessel and the inlet of a gas compressing means, while said first vessel is isolated from the inlet of said gas compressing means, until the gas pressure in said second vessel reaches said lower initial gas pressure, thereby completing the venting operation of said first vessel and making said second vessel and said gas compressing means available for the next venting operation.

14. A method in accordance with claim 13 wherein said second vessel is at least substantially as large as said first vessel.

15. A method in accordance with claim 13 wherein each venting operation for said first vessel consists essentially of the recited steps therefor.

* * * * *